United States Patent
Travis (10) Patent No.: US 9,141,418 B2
(45) Date of Patent: Sep. 22, 2015

(54) SYSTEMS AND METHODS FOR IMPLEMENTING A GUEST OPERATING SYSTEM ON A HOST OPERATING SYSTEM

(75) Inventor: Steven L. Travis, Loveland, CO (US)

(73) Assignee: HEWLETT-PACKARD DEVELOPMENT COMPANY, L.P., Houston, TX (US)

(*) Notice: Subject to any disclaimer, the term of this patent is extended or adjusted under 35 U.S.C. 154(b) by 605 days.

(21) Appl. No.: 12/842,473

(22) Filed: Jul. 23, 2010

(65) Prior Publication Data

US 2012/0023507 A1 Jan. 26, 2012

(51) Int. Cl.
G06F 9/54 (2006.01)
G06F 9/455 (2006.01)

(52) U.S. Cl.
CPC ........ G06F 9/45537 (2013.01); G06F 9/45545 (2013.01)

(58) Field of Classification Search
CPC .................... G06F 9/45537; G06F 9/45545
See application file for complete search history.

(56) References Cited

U.S. PATENT DOCUMENTS

| | | | | |
|---|---|---|---|---|
| 5,901,330 | A * | 5/1999 | Sun et al. ........................... | 710/8 |
| 7,620,955 | B1 * | 11/2009 | Nelson ........................... | 719/312 |
| 8,528,059 | B1 * | 9/2013 | Labana et al. .................... | 726/5 |
| 2007/0294707 | A1 * | 12/2007 | Taillefer et al. ............... | 719/319 |
| 2008/0086725 | A1 * | 4/2008 | Boss et al. ........................ | 718/1 |
| 2008/0184218 | A1 * | 7/2008 | Largman et al. ............. | 717/168 |
| 2008/0232398 | A1 | 9/2008 | Cromer et al. | |
| 2009/0144510 | A1 * | 6/2009 | Wibling et al. ............... | 711/147 |
| 2009/0222814 | A1 | 9/2009 | Astrand | |
| 2009/0249329 | A1 | 10/2009 | Dash | |
| 2010/0042753 | A1 | 2/2010 | Whaley et al. | |
| 2011/0307888 | A1 * | 12/2011 | Raj et al. ........................... | 718/1 |

OTHER PUBLICATIONS

MTe, Sharing files bewteen Ubuntu host and Virtual Machine, Dec. 17, 2007, pp. 1-4.*
Russ, Sharing files between a Windows guest and Ubuntu host using VMware and Samba, Apr. 22, 2007, pp. 1-12.*
Gizmag Team; "Lockheed Martin IronClad PC-on-a-Stick secures Desktop and Data for Telecommuters," Jan. 18, 2010, Gizmag. <http://www.gizmag.com/lockheed-martin-ironclad-pc-on-a-stick-secures-desktop-and-data-for-teleocommuters/13909/>.

(Continued)

*Primary Examiner* — H S Sough
*Assistant Examiner* — Syed Roni
(74) *Attorney, Agent, or Firm* — Mahamedi Paradice LLP (57) ABSTRACT

One example embodiment of a system for implementing a guest operating system on a host operating system is disclosed. The computer system comprises a memory for storing computer executable instructions, wherein the memory comprises a first partition and a second partition and a processing unit configured to access the memory and execute the computer executable instructions. The computer executable instructions comprising a host operating system stored on the first partition of the memory configured to limit the access to an I/O port, the host operating system executing a virtual machine. The computer executable instructions also comprise a guest operating system stored on the second partition of the memory, the guest operating system executing on the virtual machine of the host operating system, the guest operating system being configured to provide access to the I/O port, wherein the guest operating system is configured to transfer data between a data drive connected to the I/O port and the first partition.

13 Claims, 5 Drawing Sheets

(56) References Cited

OTHER PUBLICATIONS

Jim Clark, "Transform Windows Home Server Vail Into a Media Center, Part 1," May 18, 2010, <http://www.wegotserved.com/2010/05/18/transform-your-vail-whs-into-a-media-center-pc-part-1>.

Joe, "Virtualizing Windows Home Server on Hyper-V," Mar. 12, 2010, Unproductivity Defined, <http://web.archive.org/web/20100425025525/http://www.unproductivitydefined.com/2010/02/virtualizing-windows-home-server-on.html>.

Unknown: "Automatical:y Bypass W7 USB directly to XP mode," Web page, availabe as of May 21, 2010, <http://windows.bigresource.com/Win7-automatically-bypass-W7-USB-directly-to-XP-Mode-LJN32GRW.html>.

Xan K et al,. "Windows7, Way to automatically bypass W7 USB directly to XP Mode?," May 9-16, 2009, Windows 7 Forums, <http://www.sevenforums.com/virtualization/9362-way-automaticaily-bypass-w7-usb-directly-xp-mode.html>.

\* cited by examiner

SYSTEMS AND METHODS FOR IMPLEMENTING A GUEST OPERATING SYSTEM ON A HOST OPERATING SYSTEM

BACKGROUND

General purpose computer systems typically execute an operating system. An operating system is a set of system software programs in a computer system that regulate the ways application software programs use the computer hardware and the ways that users control the computer. For hardware functions such as input/output and memory space allocation, operating system programs act as an intermediary between application programs and the computer hardware, although application programs can be executed directly by the hardware.

A personal computer system (e.g., a micro-computer system) can be configured to execute a number of different operating systems. For example, a personal computer system can execute a variety of different MICROSOFT® products, including WINDOWS XP®, WINDOWS 7®, WINDOWS SERVER® and WINDOWS HOME SERVER®. Personal computer systems can also be configured to execute Linux, MAC OS X®, etc. Each operating system can provide specific features to a user of the computer system.

DETAILED DESCRIPTION

Figure 1:
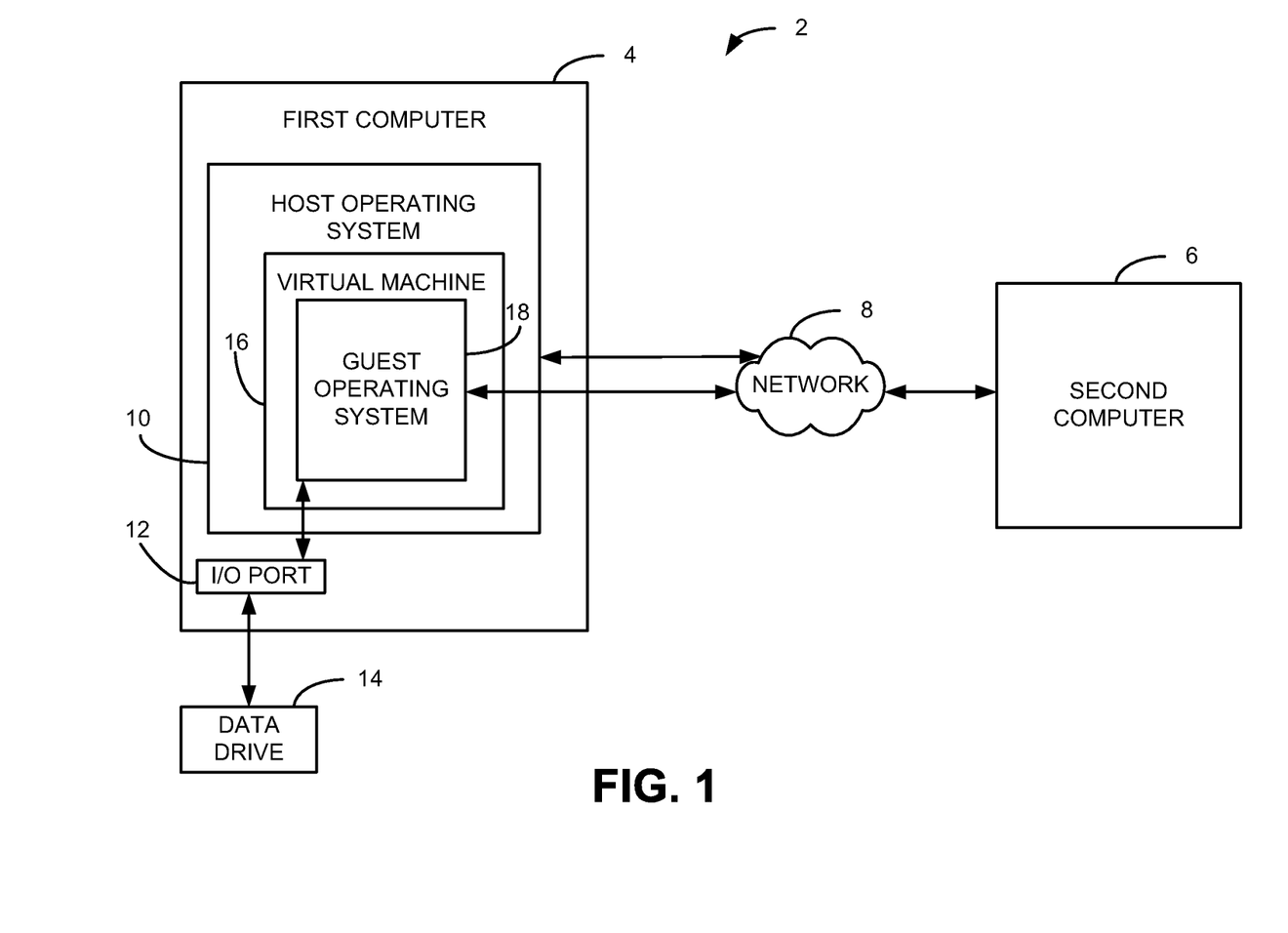
FIG. 1 illustrates an example embodiment of a computer network system.

FIG. 1 illustrates an example embodiment of a computer network system 2. The computer network system 2 can include a first computer 4 and a second computer 6 that can communicate over a network 8. The first computer 4 and the second computer 6 could be implemented as personal computers (e.g., microcomputers). The network 8 could be implemented, for example, as a network employing transmission control protocol/internet protocol (TCP/IP), such as the Internet.

The first computer 4 can include a host operating system 10 executing thereon. The host operating system 10 can be implemented as an operating system that limits the functionally and/or access to and from an input/output (I/O) port 12, such as a universal serial bus (USB) port, as discussed herein. As one example, the host operating system 10 can be implemented as MICROSOFT WINDOWS HOME SERVER®. The host operating system 10 can be installed on and/or associated with a server pool, which can be referred to as a first partition of the computer system's memory (e.g., one or more hard disk drives). In such a situation, the first partition of the memory can be implemented as a New Technology File System (NTFS). It is to be understood that the first partition can span multiple data storage components (e.g., multiple hard disk drives).

In a computer system executing certain operating systems, a computer drive can be added to the operating system upon connection of a data drive 14, such as a flash memory device (e.g., a USB flash drive) to the I/O port 12. For instance, upon insertion of the data drive 14 into a computer system executing MICROSOFT WINDOWS 7®, a drive letter can be added, and a window can be displayed that allows a user to transfer data to and from the data drive 14.

Other operating systems, (e.g., MICROSOFT WINDOWS HOME SERVER®) can be initially configured to register the connection of the data drive 14, but otherwise, the data drive 14 is ignored. In such operating systems, the only conventional way to access the drive space of the data drive 14 is to format (e.g., erase) the data space of the data drive 14 and merge the drive space of the data drive 14 with the data pool of the operating system which can include the first partition of the memory. Thus, in a computer executing one of the other operating systems, a user cannot access data stored on the data drive 14, since such data will either be ignored or erased. Stated differently, the other operating systems prevent read and write access to the data drive 14 if the data drive 14 has a partition separate from the first partition. For purposes of simplification of explanation, it will be presumed that the host operating system 10 on the first computer 4 is MICROSOFT WINDOWS HOME SERVER®.

As with most operating systems, the host operating system 10 can have additional computer applications installed to enhance the functionality of the host operating system 10. The added applications can be referred to an add-ins. The add-ins can be installed in a number of different ways. For instance, the add-ins could be installed through an Internet browser, a CD-ROM, a DVD, etc. One such add-in, which can be referred to as a virtualization add-in, installed into the host operating system 10 can repartition the memory to include at least two different partitions, namely the first partition and a second partition. The second partition can be implemented with the same file structure or a different file structure as the first partition. For example, the second partition can be implemented as a Linux partition, such as ext, ext2, ext3, ext4, etc., although one of ordinary skill in the art will appreciate that other partition formats could be employed as well. Additionally, the virtualization add-in can also install a computer application that creates a virtual machine (VM) 16, such a VMWARE®. The VM 16 can be implemented as software implementation of a computer system that executes programs like a conventional hardware implemented computer system. The virtualization add-in can be configured to install a guest operating system 18 on the VM 16. The guest operating system 18 can be implemented, for example, as Linux. Nearly any distribution of Linux could be employed as the guest operating system 18, including DEBIAN®, RED HAT®, UBUNTO® and DAMN SMALL LINUX™

Through the VM 16, the guest operating system 18 can access the I/O port 12. Therefore, the guest operating system 18 can provide full read/write access to the I/O port 12. Accordingly, data stored on the data drive 14 connected to the I/O port 12 can be accessed by the guest operating system 18 without the need for further repartitioning of the memory. By implementing the guest operating system 18 in the manner described herein, the data drive 14 can be configured to have a partition that is separate from the first partition and the second partition, and read write access to the data drive 14 is still provided. Moreover, the guest operating system 18 can be implemented to include a virtual network adapter on the VM 16 that can access the network 8. In such a situation, the virtualization add-in and the guest operating system 18 can be configured to create a network link between the VM 16 and the first computer 4, such that the guest operating system 18 and the host operating system 10 can communicate. The network link provides read and write access to the data drive 14, which access can be provided by employing the Samba protocol over the network link. In such a situation, the data drive 14 can be added as a "shared drive" to the host operating system 10, such that a user of the host operating system 10 can write data to and read data from the data drive 14 seamlessly.

Additionally or alternatively, the second computer 6 can establish a network link with the VM 16 and log into the guest operating system 18, thereby opening a session with the guest operating system 18. Moreover, the guest operating system 18 can be configured to execute a remote desktop management system such as VIRTUAL NETWORK COMPUTING (VNC)™ to provide a remote user interface of the guest operating system 18 to the second computer 6. In such a situation, a user of the second computer 6 could be provided an interface (e.g., a virtual desktop) that would, for example, allow the user to configure the guest operating system 18 and/or transfer data from the data drive 14 of the first computer 4 to the second computer 6 over the network 8.

Figure 2:
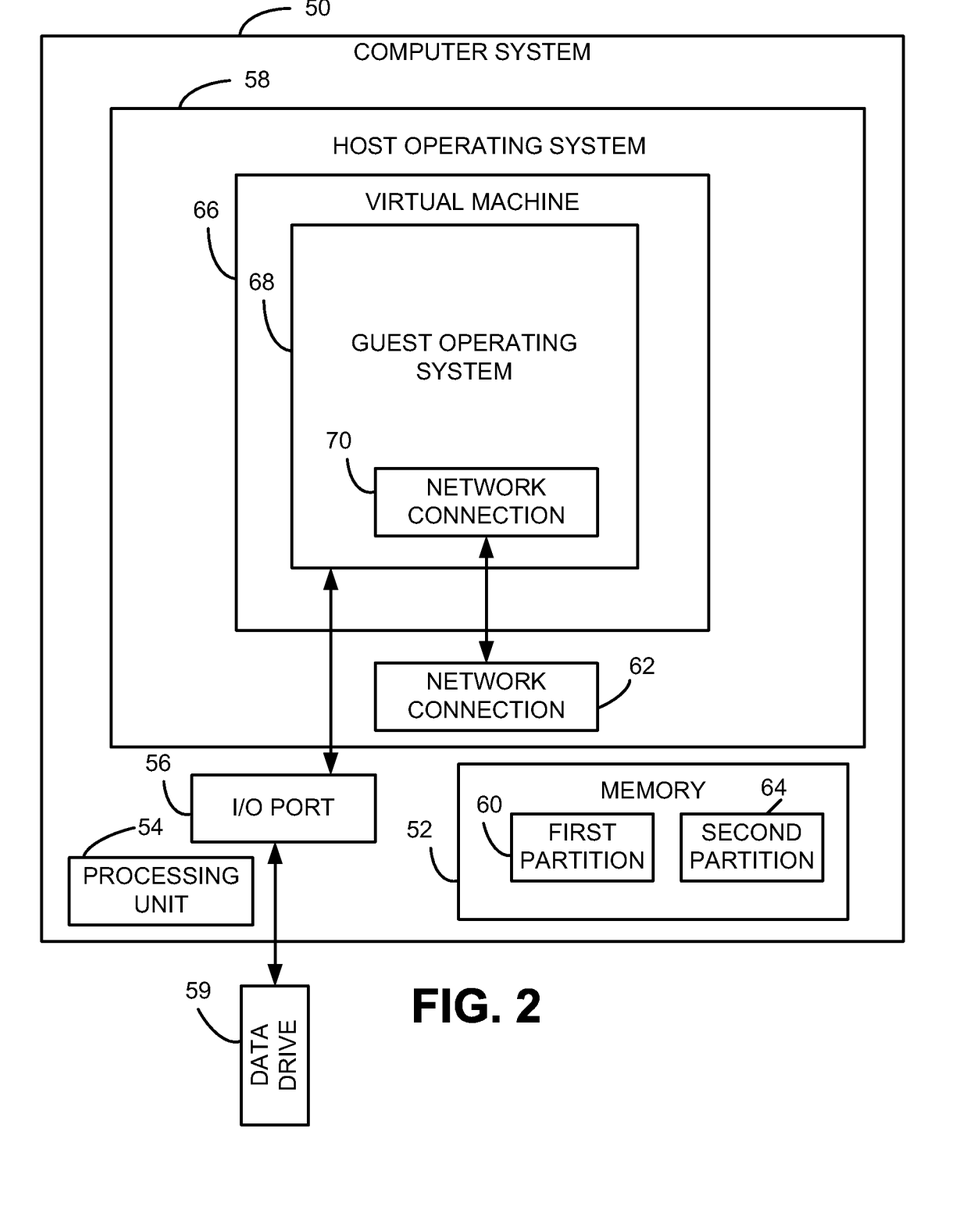
FIG. 2 illustrates an example embodiment of a computer system.

FIG. 2 illustrates an example embodiment of a computer system 50. The computer system 50 can include, for example, a memory 52 for storing computer executable instructions and data. In the present example, it is understood that the term memory refers to both volatile memory (e.g., random access memory) and nonvolatile memories (e.g., a hard drive). A processing unit 54 (e.g., one or more computer processors) can access the memory 52 and execute computer executable instructions. The computer system 50 also includes an I/O port 56, such as a USB port. For purposes of simplification of explanation, other well known computer hardware components (e.g., additional I/O ports, I/O controllers, etc.) have been omitted from FIG. 2, but are to be considered to be part of the computer system 50.

The computer system 50, via the processing unit 54 and the memory 52, can execute a host operating system 58. The host operating system 58 can be implemented as an operating system that limits the functionality and access to the I/O port 56. For the present example, it will be assumed that the host operating system 58 is implemented as MICROSOFT WINDOWS HOME SERVER®. The host operating system 58 can be configured such that upon connection of a data drive 59, such as a flash memory device (e.g., a USB flash drive) to the I/O port 56, the host operating system 58 can register the connection of the data drive 59, but otherwise, the data drive 59 is ignored. Moreover, the only conventional way to access the drive space of the data drive 59 through the host operating system 58 is to format (e.g., erase) the data space of the data drive 59 and merge the data drive 59 with a partition associated with and accessible by the host operating system 58. Thus, in a computer executing MICROSOFT WINDOWS HOME SERVER® as the host operating system 58, a user cannot access data stored on the data drive 59, as such data will either be ignored or erased.

The host operating system 58 can be stored and associated with a first partition 60 in the memory 52. As one example, the host operating system 58 can be initially configured such that the first partition 60 initially employs all of the memory 52 available in the computer system 50. In other implementations, the first partition 60 can employ less than all of the memory 52 available in the computer system 50. As one example, the first partition 60 can be implemented as an NTFS partition.

The host operating system 58 can be configured to include a network connection 62. The network connection 62 of the host operating system 58 can be implemented, for example, as a software module that interfaces with a network interface card (NIC). The network connection 62 of the host operating system 58 can, for example, be assigned a network address, such as a TCP/IP address.

The host operating system 58 can be configured to allow the installation of additional applications (e.g., computer programs), which can be referred to as add-ins. Once such add-in, which can be referred to as a virtualization add-in, can be configured to reconfigure (e.g., repartition) the memory 52 to include a second partition 64. The second partition 64 can be implemented with the same or different file structure as the first partition. As one example, the second partition can be implemented as a native Linux partition, such as for example, ext. Moreover, the virtualization add-in can be configured to install a VM 66, for example by executing VMWARE®, and to install Linux as a guest operating system 68 on the VM 66. Virtually any distribution of Linux can be employed. The guest operating system 68 can be installed on and associated with the second partition 64. The guest operating system 68 can establish a network connection 70 that operates in a similar manner as the network connection 62 of the host operating system 58. Moreover, the guest operating system 68 can be assigned its own unique network address. Thus, the computer system 50 can be assigned two different network (e.g. TCP/IP) addresses, one network address for the network connection 62 of the host operating system 58 and one network address for the network connection 70 of the guest operating system 68. Moreover, the guest operating system 68 and the virtualization add-in of the host operating system 58 can be configured to establish a network link between the guest operating system 68 and the host operating system 58.

The guest operating system 68 and the virtualization add-in can be configured such that, upon detection of the connection of the data drive 59 to the I/O port 56, data can be transferred between the data drive 59 and the first partition 60 through the network link between the guest operating system 68 and the host operating system 58. In such a situation, the network link can employ, for example the Samba protocol, but one of ordinary skill in the art will understand and appreciate that other protocols could be employed as well.

Furthermore, it is considered that a second computer system (not shown) could be configured to establish a network link with the network connection 70 of the guest operating system 68. In such a situation, a user of the second computer can log into the guest operating system 68 to initiate a session. Upon logging in, the guest operating system 68 and the virtualization add-in of the host operating system 58 can be configured to provide remote control of the guest operating system 68 by employing a remote desktop management application such as VNC™. Thus, the user of the second computer can configure the guest operating system 68. Moreover, the user of the second computer can access files in the first partition 60 or the second partition 64 of the memory 52 or files stored on the data drive 59 by employing transfer protocols such as Samba, FTP, etc.

Figure 3:
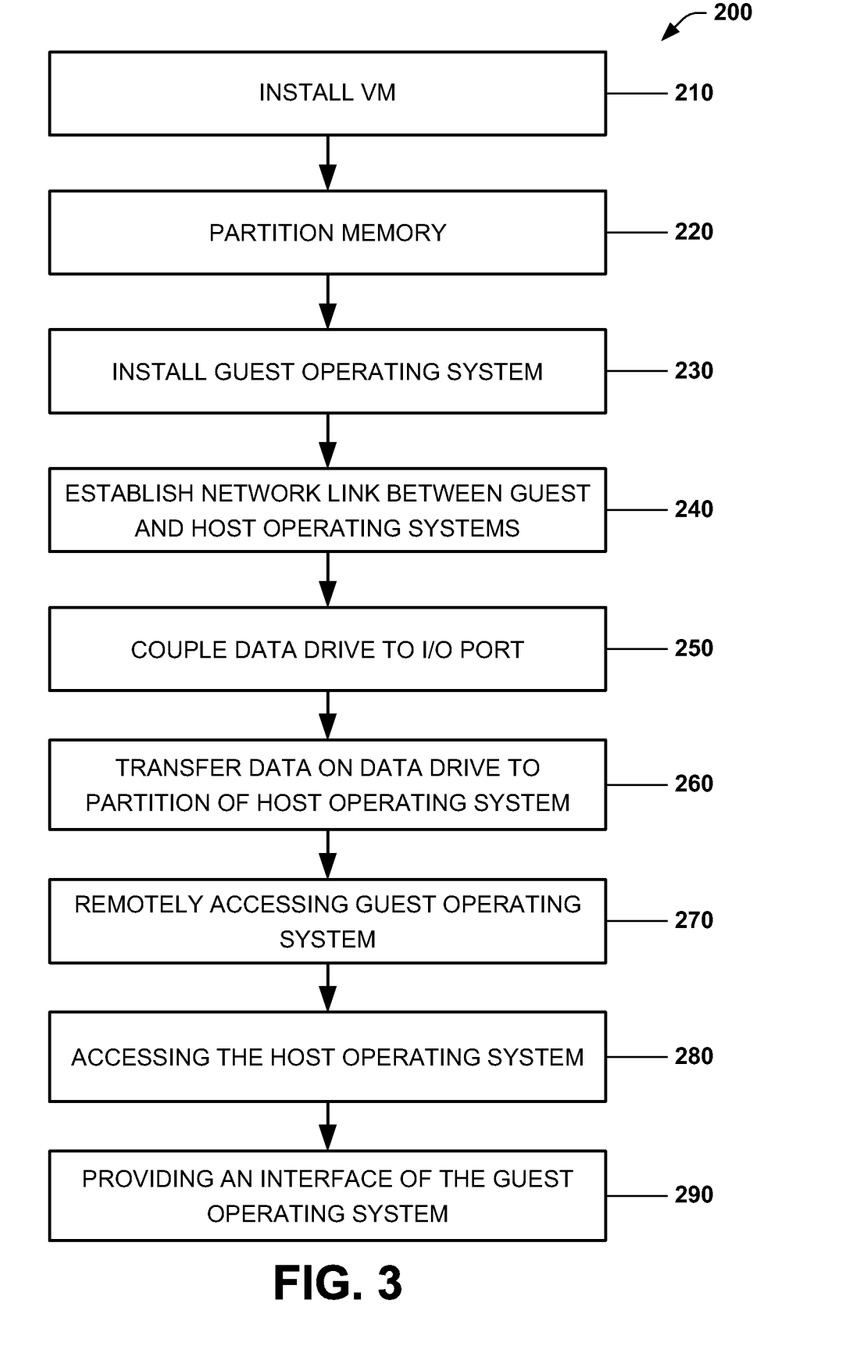
FIG. 3 illustrates an example embodiment of a flow chart of a methodology for implementing a guest operating system on a host operating system.
Figure 4:
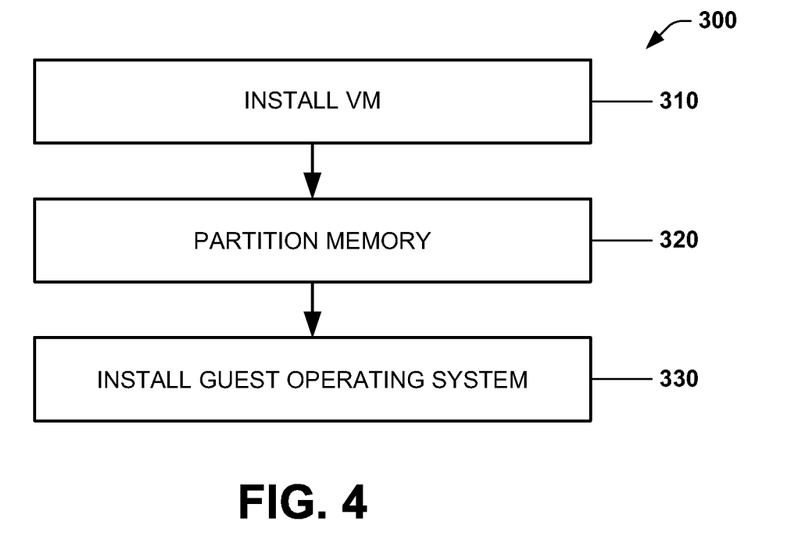
FIG. 4 illustrates another example embodiment of a flow chart of a methodology for implementing a guest operating system on a host operating system.
Figure 5:
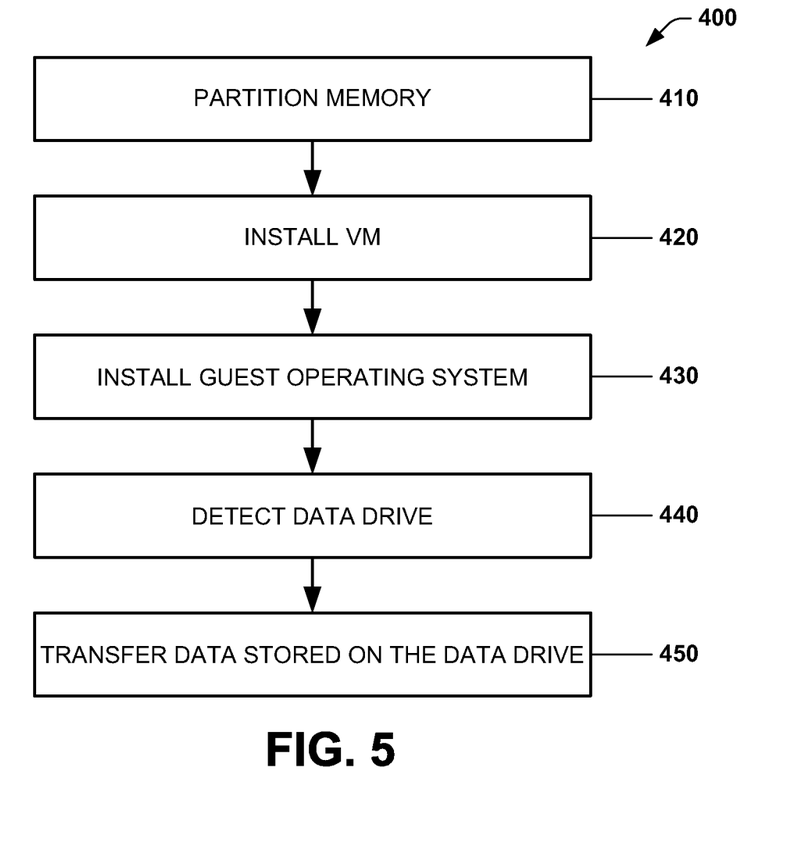
FIG. 5 illustrates yet another example embodiment of a flow chart of a methodology for implementing a guest operating system on a host operating system.

FIGS. 3-5 illustrate example embodiments of flow charts of methodologies. It is to be understood and appreciated that the illustrated actions, in other embodiments, may occur in different orders and/or concurrently with other actions. Moreover, not all illustrated features may be required to implement the methodologies.

FIG. 3 illustrates an example embodiment of a flow chart of a methodology 200 for implementing a guest operating system on a host operating system. At 210, a VM can be installed on a computer system that is executing the host operating system. At 220, the memory of the computer system can be partitioned such that the host operating system can be associated with a first partition of the memory and the VM can be associated with a second partition of the memory. The host operating system can be configured to limit functionality and access to an I/O port (e.g., a USB port) of the computer system. For instance, the host operating system can be initially configured to prevent reading and writing data to a data drive connected to the I/O port unless the drive space of the data drive 59 is merged with the first partition. At 230, the guest operating system can be installed on the second partition.

At 240, a network link can be established between the guest operating system and the host operating system. At 250, a data drive can be coupled to the I/O port. At 260, data on the data drive can be transferred to a partition associated with the host operating system, namely the first partition.

At 270, the guest operating system can be accessed remotely, for example, by a remote computer. The remote accessing can include, for example, the remote computer remotely logging into and creating a session in the guest operating system. At 280, the guest operating system can access the host operating system through the network link between the guest operating system and the host operating system. The accessing can include, for example, executing a desktop management system that controls a desktop interface of the guest operating system. At 290, the guest operating system can provide the interface of the guest operating system to the remote computer.

FIG. 4 illustrates another example embodiment a flow chart of a methodology 300 for implementing a guest operating system on a host operating system. At 310, a VM can be installed on a computer system that is executing the host operating system. The host operating system can be configured to limit functionality and access to an I/O port (e.g., a USB port) of the computer system. At 320, memory of the computer system can be partitioned such that the host operating system can be associated with a first partition of the memory and the VM can be associated with a second partition of the memory. At 330, the guest operating system can be installed on the second partition, such that the guest operating system can be associated with the second partition of the memory.

FIG. 5 illustrates yet another example embodiment of a flow chart of a methodology 400 for implementing a guest operating system on a host operating system. At 410, the memory of a computer system can be partitioned into a first partition and a second partition, such that the host operating system accesses the first partition. The host operating system can be initially configured to prevent read and write access to data stored on a data drive connected to an I/O port of the computer system if the data drive has a partition separate from the first partition of the memory. At 420, a VM can be installed on a computer system as an application of the host operating system, such that the VM can be configured to access the second partition of the memory. At 430, the guest operating system can be installed on the virtual machine, and the guest operating system accesses the second partition of the memory. At 440, the guest operating system can detect the data drive connected to the I/O port. At 450, data stored on the data drive can be transferred to the first partition of the memory.

Figure 6:
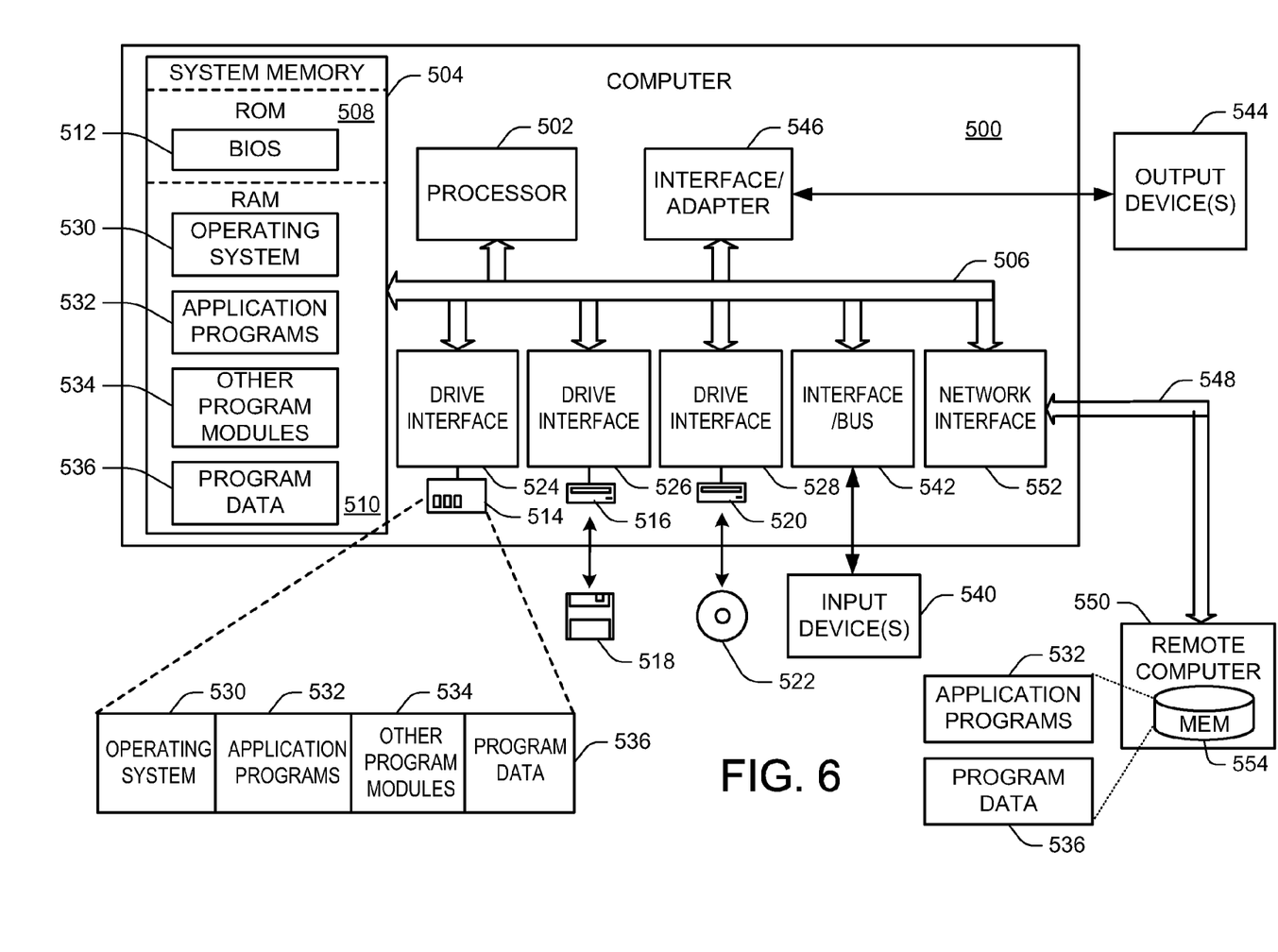
FIG. 6 illustrates an example embodiment of a computer system that can be employed to implement systems and methods described herein.

FIG. 6 illustrates an example embodiment a computer system 500 that can be employed to implement systems and methods described herein, such as based on computer executable instructions running on the computer system. The computer system 500 can be implemented on one or more general purpose networked computer systems, embedded computer systems, routers, switches, server devices, client devices, various intermediate devices/nodes and/or stand alone computer systems. Additionally, the computer system 500 can be implemented as part of the computer systems 4, 6 and 50 illustrated in FIGS. 1 and 2 executing both a host operating system and a guest operating system running computer executable instructions to perform a method as described herein.

The computer system 500 includes a processor 502 and a system memory 504. A system bus 506 couples various system components, including the system memory 504 to the processor 502. Dual microprocessors and other multi-processor architectures can also be utilized as the processor 502. The system bus 506 can be implemented as any of several types of bus structures, including a memory bus or memory controller, a peripheral bus, and a local bus using any of a variety of bus architectures. The system memory 504 includes read only memory (ROM) 508 and random access memory (RAM) 510. A basic input/output system (BIOS) 512 can reside in the ROM 508, generally containing the basic routines that help to transfer information between elements within the computer system 500, such as a reset or power-up.

The computer system 500 can include a hard disk drive 514, a magnetic disk drive 516, e.g., to read from or write to a removable disk 518, and an optical disk drive 520, e.g., for reading a CD-ROM or DVD disk 522 or to read from or write to other optical media. The hard disk drive 514, magnetic disk drive 516, and optical disk drive 520 are connected to the system bus 506 by a hard disk drive interface 524, a magnetic disk drive interface 526, and an optical drive interface 534, respectively. The drives and their associated computer-readable media provide nonvolatile storage of data, data structures, and computer-executable instructions for the computer system 500. Although the description of computer-readable media above refers to a hard disk, a removable magnetic disk and a CD, other types of media which are readable by a computer, may also be used. For example, computer executable instructions for implementing systems and methods described herein may also be stored in magnetic cassettes, flash memory cards, digital video disks and the like.

A number of program modules may also be stored in one or more of the drives as well as in the RAM 510, including an operating system 530, one or more application programs 532, other program modules 534, and program data 536 such as the systems and methods as illustrated in FIGS. 1-5. For example, the computer system 500 can be employed to implement the first or second computer 4 and 6 systems illustrated in FIG. 1.

A user may enter commands and information into the computer system 500 through user input device 540, such as a keyboard, a pointing device (e.g., a mouse). Other input devices may include a microphone, a joystick, a game pad, a scanner, a touch screen, etc. These and other input devices are often connected to the processor 502 through a corresponding interface or bus 542 that can be coupled to the system bus 506. Such input devices can alternatively be connected to the system bus 506 by other interfaces, such as a parallel port, a serial port or a universal serial bus (USB). One or more output device(s) 544, such as a visual display device or printer, can also be connected to the system bus 506 via an interface or adapter 546.

The computer system 500 may operate in a networked environment using logical connections 548 to one or more remote computers 550. The remote computer 548 may be a workstation, a computer system, a router, a peer device or other common network node, and typically includes many or all of the elements described relative to the computer system 500. The logical connections 548 can include a local area network (LAN) and a wide area network (WAN). The second computer system 6 illustrated in FIG. 1 could be implemented as a remote computer 550.

When used in a LAN networking environment, the computer system 500 can be connected to a local network through a network interface 552. When used in a WAN networking environment, the computer system 500 can include a modem (not shown), or can be connected to a communications server via a LAN. In a networked environment, application programs 532 and program data 536 depicted relative to the computer system 500, or portions thereof, may be stored in memory 554 of the remote computer 550.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications, and variations that fall within the scope of the appended claims.

What is claimed is:

1. A computer system for implementing a guest operating system on a host operating system, the computer system comprising:
    a memory storing instructions; and
    a processing unit to access the memory and execute the instructions, causing the processing unit to:
        execute a host operating system on the computer system, the host operating system preventing read and write access to a data drive coupled to an input/output (I/O) port unless drive space of the data drive is merged with a first partition of the memory on which the host operating system is executed;
        install a virtual machine on the computer system;
        partition the memory of the computer system such that the host operating system accesses the first partition of the memory and the virtual machine accesses a second partition of the memory, wherein the data drive has a partition separate from the first partition of the memory;
        execute a guest operating system on the virtual machine, the guest operating system to enable read and write access to the data drive via the I/O port; and
        establish a network link between the guest operating system and the host operating system to transfer data between the data drive connected to the I/O port and the first partition of the memory.

2. The computer system of claim 1, wherein the I/O port is a universal serial bus (USB) port.

3. The computer system of claim 1, wherein the executed instructions further cause the processing unit to:
    enable remote access, by a remote computer system, to the guest operating system over a network, the guest operating system providing a remote user interface to the remote computer system.

4. The computer system of claim 3, wherein the remote user interface enables transfer of data to and from the data drive by the remote computer system.

5. The computer system of claim 1, wherein the memory is non-volatile.

6. The computer system of claim 1, wherein upon connection of the data drive to the I/O port, the host operating system registers the connection of the data drive but otherwise ignores data stored on the data drive.

7. A method for implementing a guest operating system on a host operating system, the method comprising:
    executing a host operating system on a computer system, the host operating system preventing read and write access to a data drive coupled to an input/output (I/O) port unless drive space of the data drive is merged with a first partition of a memory on which the host operating system is executed;
    installing a virtual machine on the computer system;
    partitioning the memory of the computer system such that the host operating system accesses the first partition of the memory and the virtual machine accesses a second partition of the memory, wherein the data drive has a partition separate from the first partition of the memory;
    executing a guest operating system on the virtual machine, the guest operating system to enable read and write access to the data drive via the I/O port; and
    establishing a network link between the guest operating system and the host operating system for transferring data between the data drive and the first partition of the memory.

8. The method of claim 7, further comprising:
    enabling remote access, by a remote computer system, to the guest operating system;
    providing, to the remote computer system, access to the host operating system through the guest operating system using the network link.

9. The method of claim 8, further comprising:
    transferring data between the data drive and the remote computer through a network.

10. The method of claim 7, wherein the host operating system is installed and stored on one or more hard disk drives, and wherein a user via the host operating system is prevented from accessing data stored on the data drive due to the data drive having a partition separate from the first partition.

11. A non-transitory computer readable medium storing instructions that, when executed by one or more processors of a computer system, cause the one or more processor to:
    execute a host operating system on the computer system, the host operating system preventing read and write access to a data drive coupled to an input/output (I/O) port unless drive space of the data drive is merged with a first partition of a memory on which the host operating system is executed;
    install a virtual machine on the computer system;
    partition the memory of the computer system such that the host operating system accesses the first partition of the memory and the virtual machine accesses a second partition of the memory, wherein the data drive has a partition separate from the first partition of the memory;
    execute a guest operating system on the virtual machine, the guest operating system to enable read and write access to the data drive via the I/O port; and
    establish a network link between the guest operating system and the host operating system for transferring data between the data drive and the first partition of the memory.

12. The non-transitory computer readable medium of claim 11, wherein the executed instructions further cause the one or more processors to:

enable remote access, by a remote computer system, to the guest operating system; and provide, to the remote computer system, access to the host operating system through the guest operating system using the network link.

13. The non-transitory computer readable medium of claim 11, wherein the host operating system ignores data stored on the data drive due to the data drive having a partition separate from the first partition, and wherein the memory is nonvolatile memory.

* * * * *